United States Patent
Yokogi et al.

(10) Patent No.: US 12,085,316 B2
(45) Date of Patent: Sep. 10, 2024

(54) REFRIGERATION AND AIR-CONDITIONING APPARATUS

(71) Applicant: Mitsubishi Electric Corporation, Tokyo (JP)

(72) Inventors: Tatsuya Yokogi, Tokyo (JP); Hiroaki Makino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 239 days.

(21) Appl. No.: 17/801,299

(22) PCT Filed: May 20, 2020

(86) PCT No.: PCT/JP2020/019921
§ 371 (c)(1),
(2) Date: Aug. 22, 2022

(87) PCT Pub. No.: WO2021/234851
PCT Pub. Date: Nov. 25, 2021

(65) Prior Publication Data
US 2023/0093552 A1   Mar. 23, 2023

(51) Int. Cl.
*F25B 31/00* (2006.01)
*C09K 5/04* (2006.01)
(Continued)

(52) U.S. Cl.
CPC .......... *F25B 31/002* (2013.01); *C09K 5/042* (2013.01); *C10M 107/34* (2013.01);
(Continued)

(58) Field of Classification Search
CPC .... F25B 31/002; F25B 13/00; F25B 2500/01; F25B 2500/16; F25B 41/40; F25B 49/022; F25B 41/00
See application file for complete search history.

(56) References Cited

U.S. PATENT DOCUMENTS 5,987,914 A    11/1999  Sumida et al.

FOREIGN PATENT DOCUMENTS

JP    H09292167 A  * 11/1997
JP    2001-272117 A   10/2001
(Continued)

OTHER PUBLICATIONS

Office Action dated Mar. 7, 2023 issued in corresponding DE patent application No. 112020007215.0 (and English translation).
(Continued)

*Primary Examiner* — Kun Kai Ma
(74) *Attorney, Agent, or Firm* — Posz Law Group, PLC

(57) ABSTRACT

In a refrigeration and air-conditioning apparatus, an inner diameter of an upward-flow pipe is defined as an inner pipe diameter, where a spherical droplet of refrigerating machine oil with a diameter equal to the inner pipe diameter is defined as a spherical refrigerating machine oil droplet, and where a force received by the spherical refrigerating machine oil droplet from refrigerant in liquid form flowing upward through the upward-flow pipe is defined as a fluid force, the refrigerant in liquid form flows upward through the upward-flow pipe at such a speed that the fluid force is greater than a gravitational force applied to the spherical refrigerating machine oil droplet.

4 Claims, 3 Drawing Sheets

(51) Int. Cl.
*C10M 107/34* (2006.01)
*C10M 171/00* (2006.01)
*C10N 40/30* (2006.01)
*F24F 11/86* (2018.01)

(52) U.S. Cl.
CPC ......... *C10M 171/008* (2013.01); *F24F 11/86* (2018.01); *C09K 2205/12* (2013.01); *C10M 2209/1013* (2013.01); *C10N 2040/30* (2013.01)

(56) References Cited

FOREIGN PATENT DOCUMENTS

| | | | |
|---|---|---|---|
| JP | 3327197 B2 | 9/2002 | |
| JP | 2002267287 A | * 9/2002 | |
| JP | 2004278859 A | * 10/2004 | |
| JP | 2007248001 A | * 9/2007 | |
| JP | 2008261563 A | * 10/2008 | |
| WO | WO-2015045011 A1 | * 4/2015 | ............ F25B 31/004 |

OTHER PUBLICATIONS

International Search Report of the International Searching Authority mailed Aug. 11, 2020 in International Patent Application No. PCT/JP2020/019921 (with English translation).

* cited by examiner

REFRIGERATION AND AIR-CONDITIONING APPARATUS

CROSS REFERENCE TO RELATED APPLICATION

This application is a U.S. national stage application of PCT/JP2020/019921 filed on May 20, 2020, the contents of which are incorporated herein by reference.

TECHNICAL FIELD

The present disclosure relates to a refrigeration and air-conditioning apparatus intended to prevent a compressor from running out of refrigerating machine oil.

BACKGROUND ART

In some cases, refrigerating machine oil is stored in a compressor of a refrigeration and air-conditioning apparatus for the purpose of lubricating sliding parts of the compressor and for other purposes. This refrigerating machine oil is partially discharged with refrigerant from the compressor during operation of the refrigeration and air-conditioning apparatus, and circulates in a refrigeration cycle circuit. As an increased amount of refrigerating machine oil stays at other locations than the compressor in the refrigeration cycle circuit, there is thus a concern about insufficient lubrication of the sliding parts of the compressor. Therefore, some refrigeration and air-conditioning apparatus, intended to prevent its compressor from running out of refrigerating machine oil, has been proposed (see, for example, Patent Literature 1).

Specifically, in the refrigeration and air-conditioning apparatus described in Patent Literature 1, refrigerating machine oil to be stored in the compressor has a density lower than a density of refrigerant in liquid form to be filled in the refrigeration cycle circuit of this refrigeration and air-conditioning apparatus. In the refrigeration and air-conditioning apparatus using the refrigerating machine oil and the refrigerant as described above, the refrigerating machine oil is more likely to stay in a downward-flow pipe in a manner as described below. The downward-flow pipe, through which refrigerant in liquid form flows downward, extends in the up-down direction. Note that refrigerating machine oil that is separate from refrigerant in liquid form is hereinafter sometimes referred to as "separate refrigerating machine oil."

When refrigerating machine oil has a density lower than a density of refrigerant in liquid form, the separate refrigerating machine oil flows upward by buoyancy in the refrigerant in liquid form. Thus, when the refrigerant in liquid form flows downward through the downward-flow pipe at a low speed, a decreased amount of separate refrigerating machine oil flows downward with the refrigerant in liquid form. This causes the separate refrigerating machine oil to stay in the downward-flow pipe. In view of this, in the refrigeration and air-conditioning apparatus described in Patent Literature 1, refrigerant in liquid form flows downward through the downward-flow pipe at a speed higher than or equal to a predetermined speed to increase the fluid force received by the separate refrigerating machine oil from the refrigerant in liquid form flowing downward through the downward-flow pipe, thereby to prevent the separate refrigerating machine oil from staying in the downward-flow pipe. With this configuration, the refrigeration and air-conditioning apparatus described in Patent Literature 1 is intended to prevent its compressor from running out of refrigerating machine oil.

CITATION LIST

Patent Literature

Patent Literature 1: Japanese Patent No. 3327197

SUMMARY OF INVENTION

Technical Problem

Some refrigeration and air-conditioning apparatus includes an upward-flow pipe that extends in the up-down direction and through which refrigerant in liquid form flows upward. With this configuration, in a case where refrigerating machine oil to be used has a density lower than a density of refrigerant in liquid form as described in the refrigeration and air-conditioning apparatus described in Patent Literature 1, separate refrigerating machine oil flows upward by buoyancy in the refrigerant in liquid form, and thus does not stay in the upward-flow pipe. In contrast, in some cases, some refrigeration and air-conditioning apparatuses may use refrigerating machine oil with a density higher than a density of refrigerant in liquid form. In this case, there is a concern about the refrigerating machine oil that may stay in the upward-flow pipe. The reason for this concern is that when refrigerating machine oil to be used has a density higher than a density of refrigerant in liquid form, separate refrigerating machine oil flows downward in the refrigerant in liquid form by a gravitational force. However, any of the refrigeration and air-conditioning apparatuses that have been proposed are not intended to prevent the refrigerating machine oil from staying in the upward-flow pipe. Thus, in a case where some refrigeration and air-conditioning apparatus uses refrigerating machine oil with a density higher than a density of refrigerant in liquid form, there is a problem in that the refrigerating machine oil may stay in the upward-flow pipe, and thus the compressor may possibly run out of the refrigerating machine oil.

The present disclosure has been achieved to solve the above problems, and an objective of the present disclosure is to propose a refrigeration and air-conditioning apparatus that can further prevent a compressor, when refrigerating machine oil to be used has a density higher than a density of refrigerant in liquid form, from running out of the refrigerating machine oil, compared to some refrigeration and air-conditioning apparatus.

Solution to Problem

A refrigeration and air-conditioning apparatus according to an embodiment of the present disclosure includes a refrigeration cycle circuit including a compressor, a condenser, a pressure reducing device, a refrigerant pipe connecting the condenser and the pressure reducing device, and an evaporator, the refrigeration cycle circuit being filled with refrigerant. The refrigerant pipe includes an upward-flow pipe that is a pipe that extends in an up-down direction and through which the refrigerant in liquid form flows upward after the refrigerant flows out of the condenser, and refrigerating machine oil to be stored in the compressor has a density higher than a density of the refrigerant in liquid form. Where an inner diameter of the upward-flow pipe is defined as an inner pipe diameter, where a spherical droplet of the refrigerating machine oil with a diameter equal to the inner pipe diameter is defined as a spherical refrigerating machine oil droplet, and where a force received by the spherical refrigerating machine oil droplet from the refrigerant in liquid form flowing upward through the upward-flow pipe is defined as a fluid force, the refrigerant in liquid form flows upward through the upward-flow pipe at such a speed that the fluid force is greater than a gravitational force applied to the spherical refrigerating machine oil droplet.

Advantageous Effects of Invention

In the refrigeration and air-conditioning apparatus according to an embodiment of the present disclosure, separate refrigerating machine oil present in the upward-flow pipe is applied with the fluid force in such a direction as to allow the separate refrigerating machine oil to flow upward, and is applied with a gravitational force in such a direction as to allow the separate refrigerating machine oil to flow downward. At this time, in the refrigeration and air-conditioning apparatus according to an embodiment of the present disclosure, the fluid force applied to the separate refrigerating machine oil is greater than the gravitational force applied to the separate refrigerating machine oil. With this configuration, in the refrigeration and air-conditioning apparatus according to an embodiment of the present disclosure, the refrigerant in liquid form flowing upward through the upward-flow pipe helps discharge the separate refrigerating machine oil from the upward-flow pipe, and the refrigerating machine oil is thus further prevented from staying in the upward-flow pipe, compared to some refrigeration and air-conditioning apparatus. Therefore, the refrigeration and air-conditioning apparatus according to an embodiment of the present disclosure can further prevent the compressor, when refrigerating machine oil to be used has a density higher than a density of refrigerant in liquid form, from running out of the refrigerating machine oil, compared to some refrigeration and air-conditioning apparatus.

DESCRIPTION OF EMBODIMENT

In an embodiment below, an example of a refrigeration and air-conditioning apparatus according to the present disclosure is described. Note that in the embodiment below, the example is described in which the refrigeration and air-conditioning apparatus according to the present disclosure is used as an air-conditioning apparatus that conditions air in a room.

Figure 1:
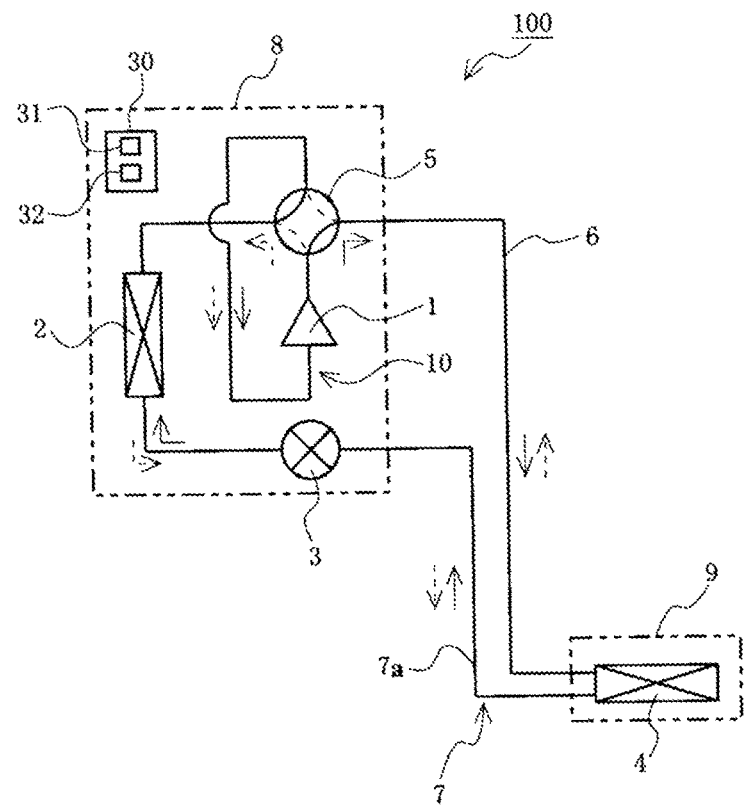
FIG. 1 is a refrigerant circuit diagram of a refrigeration and air-conditioning apparatus according to the present embodiment.

FIG. 1 is a refrigerant circuit diagram of a refrigeration and air-conditioning apparatus according to the present embodiment.

A refrigeration and air-conditioning apparatus 100 according to the present embodiment is configured to be capable of performing at least heating operation. The refrigeration and air-conditioning apparatus 100 includes a refrigeration cycle circuit 10 in which refrigerant is filled. Although the refrigerant to be filled in the refrigeration cycle circuit 10 is not limited to a particular refrigerant, propane is used in the present embodiment as refrigerant to be filled in the refrigeration cycle circuit 10. Hereinafter, propane is referred to as "R290."

The refrigeration cycle circuit 10 includes a compressor 1, a use-side heat exchanger 4, a pressure reducing device 3, and a heat-source-side heat exchanger 2. The refrigeration cycle circuit 10 further includes a refrigerant pipe connecting the compressor 1, the use-side heat exchanger 4, the pressure reducing device 3, and the heat-source-side heat exchanger 2.

The compressor 1 sucks and compresses low-pressure refrigerant in gas form into high-temperature and high-pressure refrigerant in gas form and discharges the refrigerant. The compressor 1 can be made up of, for example, a rotary compressor, a scroll compressor, a screw compressor, or a reciprocating compressor. Preferably, the compressor 1 is, for example, an inverter compressor capable of controlling the driving frequency. The compressor 1 has refrigerating machine oil stored in its inside for the purpose of lubricating sliding parts of this compressor 1 and for other purposes. This refrigerating machine oil has a density higher than a density of refrigerant in liquid form to be filled in the refrigeration cycle circuit 10. Further, in the present embodiment, this refrigerating machine oil does not have mutual solubility in refrigerant to be filled in the refrigeration cycle circuit 10, or has a very low degree of mutual solubility in the refrigerant. Specifically, in the present embodiment, polyalkylene glycol is used as refrigerating machine oil. Polyalkylene glycol is hereinafter referred to as "PAG." PAG has a very low degree of mutual solubility in R290. In addition, PAG has a density higher than a density of R290 in liquid form. Note that in the present embodiment, in a case where, in a mixture of refrigerant and refrigerating machine oil, the ratio of volume of the refrigerating machine oil is higher than or equal to 5%, and the temperature of the mixture is higher than or equal to 60 degrees C., when undissolved refrigerating machine oil is present in the refrigerant, this refrigerating machine oil to be used has a very low degree of mutual solubility in the refrigerant.

The use-side heat exchanger 4 serves as a condenser during heating operation. That is, during heating operation, the use-side heat exchanger 4 condenses high-temperature and high-pressure refrigerant in gas form discharged from the compressor 1 into high-pressure refrigerant in liquid form. The use-side heat exchanger 4 can be made up of, for example, a fin-and-tube heat exchanger, a microchannel heat exchanger, a shell-and-tube heat exchanger, a heat-pipe heat exchanger, a double-pipe heat exchanger, or a plate heat exchanger. In the vicinity of the use-side heat exchanger 4, a fan, which is not illustrated, is provided to supply room air to this use-side heat exchanger 4. Note that a refrigerant pipe connecting the use-side heat exchanger 4 and a refrigerant discharge port of the compressor 1 during heating operation is hereinafter referred to as a "refrigerant pipe 6."

The pressure reducing device 3 expands high-pressure refrigerant in liquid form, having flowed out of the condenser, and reduces the pressure of this refrigerant to be brought into low-temperature and low-pressure two-phase gas-liquid refrigerant. The pressure reducing device 3 can be made up of, for example, an electronic expansion valve capable of adjusting the flow rate of refrigerant. Note that a refrigerant pipe connecting the use-side heat exchanger 4 and the pressure reducing device 3 is hereinafter referred to as a "refrigerant pipe 7." That is, during heating operation, refrigerant in liquid form flows through the refrigerant pipe 7. As illustrated in FIG. 1, the refrigerant pipe 7 includes an upward-flow pipe 7a that is a pipe that extends in the up-down direction and through which refrigerant in liquid form flows upward after the refrigerant flows out of the condenser. Note that in the present embodiment, the wording "extending in the up-down direction" does not mean strictly extending in the vertical direction, but the upward-flow pipe 7a may be inclined to the vertical direction.

The heat-source-side heat exchanger 2 serves as an evaporator during heating operation. That is, during heating operation, the heat-source-side heat exchanger 2 evaporates low-temperature and low-pressure two-phase gas-liquid refrigerant, having flowed out of the pressure reducing device 3, into low-pressure refrigerant in gas form. The heat-source-side heat exchanger 2 can be made up of, for example, a fin-and-tube heat exchanger, a microchannel heat exchanger, a shell-and-tube heat exchanger, a heat-pipe heat exchanger, a double-pipe heat exchanger, or a plate heat exchanger. In the vicinity of the heat-source-side heat exchanger 2, a fan, which is not illustrated, is provided to supply outside air to this heat-source-side heat exchanger 2.

The refrigeration and air-conditioning apparatus 100 according to the present embodiment is configured to be capable of performing cooling operation in addition to the heating operation. With this configuration, the refrigeration cycle circuit 10 includes a four-way valve 5. The four-way valve 5 switches the communication destination for the discharge port of the compressor 1 between the use-side heat exchanger 4 and the heat-source-side heat exchanger 2. Specifically, during heating operation, the four-way valve 5 switches the flow passage to the one illustrated by the solid lines in FIG. 1. More specifically, during heating operation, the four-way valve 5 serves as a flow passage that allows the discharge port of the compressor 1 to communicate with the use-side heat exchanger 4, and allows a suction port of the compressor 1 to communicate with the heat-source-side heat exchanger 2. With this flow passage, the use-side heat exchanger 4 serves as a condenser, while the heat-source-side heat exchanger 2 serves as an evaporator. During cooling operation, the four-way valve 5 switches the flow passage to the one illustrated by the broken lines in FIG. 1. More specifically, during cooling operation, the four-way valve 5 serves as a flow passage that allows the discharge port of the compressor 1 to communicate with the heat-source-side heat exchanger 2, and allows the suction port of the compressor 1 to communicate with the use-side heat exchanger 4. With this flow passage, the heat-source-side heat exchanger 2 serves as a condenser, while the use-side heat exchanger 4 serves as an evaporator.

The refrigeration and air-conditioning apparatus 100 includes an outdoor unit 8 and an indoor unit 9. The compressor 1, the heat-source-side heat exchanger 2, the pressure reducing device 3, the use-side heat exchanger 4, and the four-way valve 5, which are described above, are accommodated in either the outdoor unit 8 or the indoor unit 9. Specifically, the compressor 1, the heat-source-side heat exchanger 2, the pressure reducing device 3, and the four-way valve 5 are accommodated in the outdoor unit 8. The use-side heat exchanger 4 is accommodated in the indoor unit 9. The outdoor unit 8 and the indoor unit 9 are thus connected to each other by the refrigerant pipe 6 and the refrigerant pipe 7 as illustrated in FIG. 1.

The refrigeration and air-conditioning apparatus 100 according to the present embodiment further includes a controller 30 configured to control the driving frequency of the compressor 1. Note that in the present embodiment, the controller 30 is configured to exercise control such as switching between the flow passages of the four-way valve 5 and the opening degree of the pressure reducing device 3, in addition to the driving frequency of the compressor 1. The controller 30 is made up of either dedicated hardware or a central processing unit (CPU) to execute programs stored in a memory. Note that the CPU is also referred to as a "central processing device," a "processing device," a "computation device," a "microprocessor," a "microcomputer," or a "processor."

When the controller 30 is dedicated hardware, the controller 30 is equivalent to, for example, a single circuit, a combined circuit, an application specific integrated circuit (ASIC), a field-programmable gate array (FPGA), or a combination of these circuits. The functional units of the controller 30 may be individually implemented by separate units of hardware, or the functional units of the controller 30 may be implemented together by a single unit of hardware.

When the controller 30 is the CPU, the functions to be executed by the controller 30 are implemented by software, firmware, or a combination of software and firmware. The software and firmware are described as programs and stored in the memory. The CPU reads and executes the programs stored in the memory, thereby implementing the functions of the controller 30. For example, the memory is a nonvolatile or volatile semiconductor memory such as a RAM, a ROM, a flash memory, an EPROM, and an EEPROM.

Note that the functions of the controller 30 may be partially implemented by dedicated hardware, while the rest is implemented by software or firmware. In the present embodiment, the controller 30 is accommodated in the outdoor unit 8. However, the controller 30 may be accommodated in the indoor unit 9 instead. The controller 30 may be divided into two sections to be each accommodated in the corresponding one of the outdoor unit 8 and the indoor unit 9.

For example, the controller 30 includes, as its functional units, a control unit 31 and a memory 32. The control unit 31 is a functional unit to control the driving frequency of the compressor 1, the flow passage of the four-way valve 5, the opening degree of the pressure reducing device 3, and other conditions. The memory 32 is a functional unit to store in its inside necessary information for the control unit 31 to control the driving frequency of the compressor 1 and other conditions.

Figure 2:
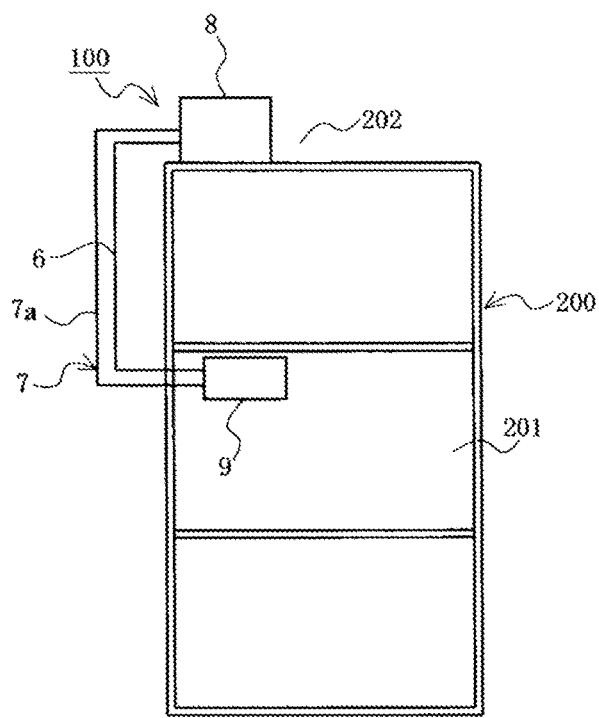
FIG. 2 illustrates an example of the installation of the refrigeration and air-conditioning apparatus according to the present embodiment.

FIG. 2 illustrates an example of the installation of the refrigeration and air-conditioning apparatus according to the present embodiment.

In the example of the installation illustrated in FIG. 2, the indoor unit 9 is installed in a room 201 in a building 200. The outdoor unit 8 is installed on an outside 202 of the building 200 such as on the roof. That is, in the example of the installation illustrated in FIG. 2, the use-side heat exchanger 4, which serves as a condenser during heating operation is accommodated in the indoor unit 9, and this indoor unit 9 is installed at a location lower than the outdoor unit 8 having the pressure reducing device 3 accommodated in its inside.

In a case where the outdoor unit 8 and the indoor unit 9 are installed in this manner, the length of the upward-flow pipe 7a of the refrigerant pipe 7 is increased. As described later, the refrigeration and air-conditioning apparatus 100 according to the present embodiment can further prevent the refrigerating machine oil from staying in the upward-flow pipe 7a, compared to some refrigeration and air-conditioning apparatus, during heating operation during which refrigerant in liquid form flows upward through the upward-flow pipe 7a. It is thus preferable to employ the refrigeration and air-conditioning apparatus 100 according to the present embodiment as a refrigeration and air-conditioning apparatus having an outdoor unit and an indoor unit installed in its inside as illustrated in FIG. 2.

Subsequently, operation of the refrigeration and air-conditioning apparatus 100 is described.

Figure 3:
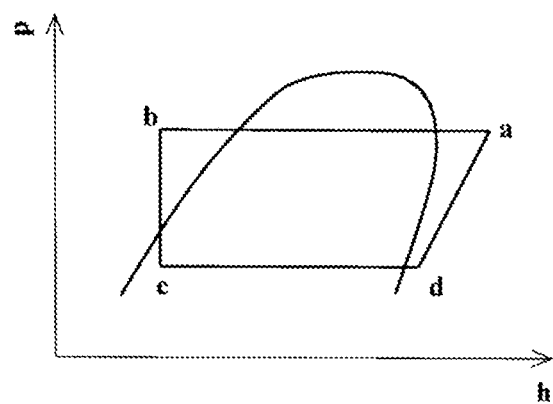
FIG. 3 is a pressure-enthalpy chart illustrating the refrigeration cycle of the refrigeration and air-conditioning apparatus according to the present embodiment.

FIG. 3 is a pressure-enthalpy chart illustrating the refrigeration cycle of the refrigeration and air-conditioning apparatus according to the present embodiment. Note that in FIG. 3, the vertical axis represents a pressure "p," while the horizontal axis represents an enthalpy "h."

Operation of the refrigeration and air-conditioning apparatus 100 is described below with reference to FIGS. 1 and 3.

During heating operation, the control unit 31 in the controller 30 switches the flow passage of the four-way valve 5 to the flow passage illustrated by the solid lines in FIG. 1. The control unit 31 activates the compressor 1. This allows refrigerant to flow in the refrigeration cycle circuit 10 in a manner as illustrated by the solid arrows in FIG. 1. Specifically, the compressor 1 sucks and compresses low-pressure refrigerant in gas form represented as a state "d" in FIG. 3, and then discharges high-temperature and high-pressure refrigerant in gas form represented as a state "a" in FIG. 3. The high-temperature and high-pressure refrigerant in gas form discharged from the compressor 1 passes through the refrigerant pipe 6 and flows into the use-side heat exchanger 4, which serves as a condenser. When room air is heated, the high-temperature and high-pressure refrigerant in gas form, having flowed into the use-side heat exchanger 4, is cooled by the room air and thus condenses into low-pressure refrigerant in liquid form represented as a state "b" in FIG. 3, and then flows out of the use-side heat exchanger 4.

The low-pressure refrigerant in liquid form having flowed out of the use-side heat exchanger 4 passes through the refrigerant pipe 7 and flows into the pressure reducing device 3. That is, during heating operation, the refrigerant in liquid form, having flowed out of the use-side heat exchanger 4, flows upward through the upward-flow pipe 7a of the refrigerant pipe 7. The low-pressure refrigerant in liquid form having flowed into the pressure reducing device 3 is reduced in pressure in the pressure reducing device 3 into low-temperature and low-pressure two-phase gas-liquid refrigerant represented as a state "c" in FIG. 3. Then, the low-temperature and low-pressure two-phase gas-liquid refrigerant flows out of the pressure reducing device 3. The low-temperature and low-pressure two-phase gas-liquid refrigerant, having flowed out of the pressure reducing device 3, flows into the heat-source-side heat exchanger 2, which serves as an evaporator. The low-temperature and low-pressure two-phase gas-liquid refrigerant, having flowed into the heat-source-side heat exchanger 2, is heated by outside air and thus evaporates into low-pressure refrigerant in gas form represented as a state "d" in FIG. 3. Then, the low-pressure refrigerant in gas form flows out of the heat-source-side heat exchanger 2. The low-pressure refrigerant in gas form having flowed out of the heat-source-side heat exchanger 2 is sucked into the compressor 1 and compressed again.

During cooling operation, the control unit 31 in the controller 30 switches the flow passage of the four-way valve 5 to the flow passage illustrated by the broken lines in FIG. 1. The control unit 31 activates the compressor 1. This allows refrigerant to flow in the refrigeration cycle circuit 10 in a manner as illustrated by the broken arrows in FIG. 1. Specifically, the compressor 1 sucks and compresses low-pressure refrigerant in gas form represented as a state "d" in FIG. 3, and then discharges high-temperature and high-pressure refrigerant in gas form represented as a state "a" in FIG. 3. The high-temperature and high-pressure refrigerant in gas form discharged from the compressor 1 flows into the heat-source-side heat exchanger 2, which serves as a condenser. The high-temperature and high-pressure refrigerant in gas form, having flowed into the heat-source-side heat exchanger 2, is cooled by outside air and thus condenses into low-pressure refrigerant in liquid form represented as a state "b" in FIG. 3. Then, the low-pressure refrigerant in liquid form flows out of the heat-source-side heat exchanger 2.

The low-pressure refrigerant in liquid form having flowed out of the heat-source-side heat exchanger 2 flows into the pressure reducing device 3. The low-pressure refrigerant in liquid form having flowed into the pressure reducing device 3 is reduced in pressure in the pressure reducing device 3 into low-temperature and low-pressure two-phase gas-liquid refrigerant represented as a state "c" in FIG. 3. Then, the low-temperature and low-pressure two-phase gas-liquid refrigerant flows out of the pressure reducing device 3. The low-temperature and low-pressure two-phase gas-liquid refrigerant having flowed out of the pressure reducing device 3 passes through the refrigerant pipe 7, and flows into the use-side heat exchanger 4, which serves as an evaporator. When room air is cooled, the low-temperature and low-pressure two-phase gas-liquid refrigerant, having flowed into the use-side heat exchanger 4, is heated by the room air and thus evaporates into low-pressure refrigerant in gas form represented as a state "d" in FIG. 3. Then, the low-pressure refrigerant in gas form flows out of the use-side heat exchanger 4. The low-pressure refrigerant in gas form having flowed out of the use-side heat exchanger 4 passes through the refrigerant pipe 6, and is thereafter sucked into the compressor 1 and compressed again.

During operation of the refrigeration and air-conditioning apparatus 100 as described above, refrigerating machine oil stored in the compressor 1 is partially discharged with refrigerant from the compressor 1, and circulates in the refrigeration cycle circuit 10. As described above, in the refrigeration and air-conditioning apparatus according to the present embodiment, refrigerating machine oil has a density higher than a density of refrigerant in liquid form. When the refrigerating machine oil is separate from the refrigerant in liquid form, the refrigerating machine oil thus moves in the refrigerant in liquid form in a manner as described below. Refrigerating machine oil that is separate from refrigerant in liquid form is hereinafter sometimes referred to as "separate refrigerating machine oil."

Separate refrigerating machine oil with a density higher than a density of refrigerant in liquid form flows downward in the refrigerant in liquid form by a gravitational force applied to the separate refrigerating machine oil. Thus, in a refrigerant pipe through which refrigerant in liquid form flows downward, the separate refrigerating machine oil flows smoothly with the refrigerant in liquid form. In contrast, in the upward-flow pipe 7a through which refrigerant in liquid form flows upward, the separate refrigerating machine oil flows downward through the upward-flow pipe 7a against the upward flow of refrigerant in liquid form. Consequently, the separate refrigerating machine oil with a density higher than a density of the refrigerant in liquid form is more likely to stay in the upward-flow pipe 7a. As an increased amount of separate refrigerating machine oil stays in the upward-flow pipe 7a, a decreased amount of refrigerating machine oil returns to the compressor 1. There is thus a concern about an insufficient amount of refrigerating machine oil stored in the compressor 1. An insufficient amount of refrigerating machine oil stored in the compressor 1 causes another concern about insufficient lubrication of the sliding parts of the compressor 1. Particularly, in the present embodiment, this refrigerating machine oil does not have mutual solubility in refrigerant filled in the refrigeration cycle circuit 10, or has a very low degree of mutual solubility in the refrigerant. That is, in the refrigeration and air-conditioning apparatus 100 according to the present embodiment, an increased amount of separate refrigerating machine oil is present in the upward-flow pipe 7a. This causes a stronger concern about an insufficient amount of refrigerating machine oil stored in the compressor 1.

Thus, during heating operation during which refrigerant in liquid form flows upward through the upward-flow pipe 7a, in the refrigeration and air-conditioning apparatus 100 according to the present embodiment, a speed of the refrigerant in liquid form is set in a manner as described below to prevent the separate refrigerating machine oil from staying in the upward-flow pipe 7a. In other words, during heating operation during which refrigerant in liquid form flows upward through the upward-flow pipe 7a, the control unit 31 in the controller 30 controls the driving frequency of the compressor 1, such that the refrigerant in liquid form flows upward through the upward-flow pipe 7a at a speed equal to the speed explained below, to thereby prevent the separate refrigerating machine oil from staying in the upward-flow pipe 7a.

Figure 4:
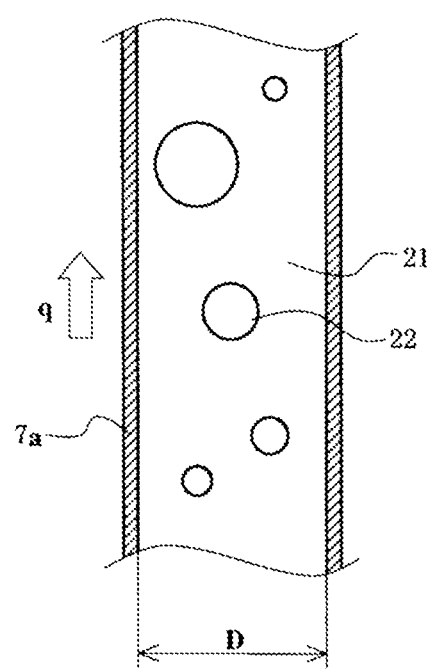
FIG. 4 is an explanatory diagram describing the status of a flow of separate refrigerating machine oil in an upward-flow pipe of the refrigeration and air-conditioning apparatus according to the present embodiment.

FIG. 4 is an explanatory diagram describing the status of a flow of separate refrigerating machine oil in the upward-flow pipe of the refrigeration and air-conditioning apparatus according to the present embodiment. FIG. 4 is a vertical cross-sectional view of the upward-flow pipe 7a, illustrating the state of refrigerant 21 in liquid form flowing upward in the upward-flow pipe 7a during heating operation. Note that the open arrow in FIG. 4 illustrates the flow direction of the refrigerant 21 in liquid form. Note that a force received by separate refrigerating machine oil 22 from the refrigerant 21 in liquid form flowing through the upward-flow pipe 7a is hereinafter referred to as a "fluid force."

During heating operation during which the refrigerant 21 flows upward, the separate refrigerating machine oil 22 present in the upward-flow pipe 7a partially becomes an oil film and flows along the inner wall of the upward-flow pipe 7a However, the major portion of the separate refrigerating machine oil 22 present in the upward-flow pipe 7a has become oil droplets. For example, the oil droplets of the separate refrigerating machine oil 22 are spherical. The spherical oil droplets of the separate refrigerating machine oil 22 have various diameters. As the spherical oil droplets of the separate refrigerating machine oil 22 have a smaller diameter, the separate refrigerating machine oil 22 is applied with a smaller gravitational force. The fluid force received by the separate refrigerating machine oil 22 from the refrigerant 21 in liquid form helps the separate refrigerating machine oil 22 to easily flow upward with the refrigerant 21 in liquid form. That is, as the spherical oil droplets of the separate refrigerating machine oil 22 have a smaller diameter, the separate refrigerating machine oil 22 flows out of the upward-flow pipe 7a more easily, and is less likely to stay in the upward-flow pipe 7a. In other words, as the spherical oil droplets of the separate refrigerating machine oil 22 have a larger diameter, the separate refrigerating machine oil 22 flows out of the upward-flow pipe 7a less easily, and is more likely to stay in the upward-flow pipe 7a.

When oil droplets of the separate refrigerating machine oil 22 are relatively large to a certain extent, these oil droplets of the separate refrigerating machine oil 22 become flattened in shape by the fluid force received from the refrigerant 21 in liquid form. Specifically, the separate refrigerating machine oil 22 receives the fluid force from the refrigerant 21 in liquid form from below. With this fluid force, the oil droplets of the separate refrigerating machine oil 22 become deformed in the up-down direction into a flat shape extending in the lateral direction. Thus, flat-shaped oil droplets of the separate refrigerating machine oil 22 receive a greater fluid force from the refrigerant 21 in liquid form, compared to the spherical oil droplets of the separate refrigerating machine oil 22. The flat-shaped oil droplets of the separate refrigerating machine oil 22 thus flow upward with the refrigerant 21 in liquid form more easily.

In view of this, a spherical droplet of the separate refrigerating machine oil 22 having the largest diameter that can be theoretically formed in the upward-flow pipe 7a is least likely to flow upward in the upward-flow pipe 7a. Thus, when the spherical droplet of the separate refrigerating machine oil 22 having the largest diameter that can be theoretically formed in the upward-flow pipe 7a can flow upward, the separate refrigerating machine oil 22 can be prevented from staying in the upward-flow pipe 7a. A spherical droplet of the separate refrigerating machine oil 22 having the largest diameter that can be theoretically formed in the upward-flow pipe 7a is hereinafter referred to as "spherical refrigerating machine oil droplet 23." The specific structure of the spherical refrigerating machine oil droplet 23 is described below in FIG. 5.

Figure 5:
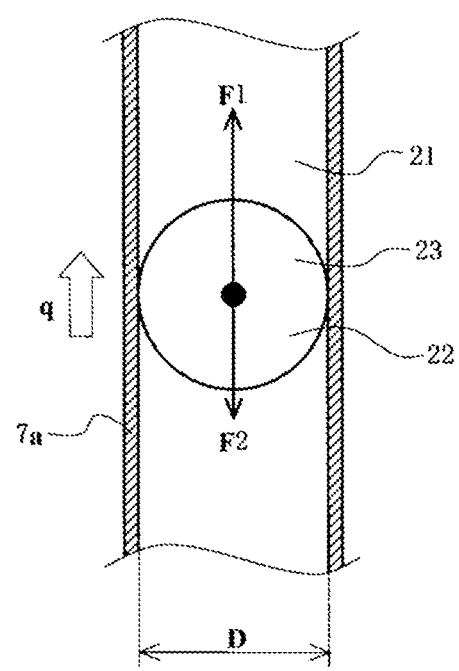
FIG. 5 is an explanatory diagram illustrating a spherical droplet of separate refrigerating machine oil with the largest diameter that can be theoretically formed in the upward-flow pipe of the refrigeration and air-conditioning apparatus according to the present embodiment.

FIG. 5 is an explanatory diagram illustrating a spherical droplet of separate refrigerating machine oil with the largest diameter that can be theoretically formed in the upward-flow pipe of the refrigeration and air-conditioning apparatus according to the present embodiment. FIG. 5 is a vertical cross-sectional view of the upward-flow pipe 7a. Note that the open arrow in FIG. 5 illustrates the flow direction of the refrigerant 21 in liquid form.

As illustrated in FIGS. 4 and 5, the upward-flow pipe 7a has an inner diameter defined as an inner pipe diameter "D." In a case where the inner pipe diameter "D" is defined as described above, the spherical refrigerating machine oil droplet 23, that is a spherical droplet of the separate refrigerating machine oil 22 having the largest diameter that can be theoretically formed in the upward-flow pipe 7a, has a diameter equal to the inner pipe diameter "D" as illustrated in FIG. 5.

Where a force received by the spherical refrigerating machine oil droplet 23 from the refrigerant 21 in liquid form flowing upward through the upward-flow pipe 7a is represented as a fluid force F1, the fluid force F1 is expressed by the following expression (1).

$$F1 = C_d \times p \times q^2 \times A/2 \ldots \quad (1)$$

In this expression, $C_d$ represents a drag coefficient that is determined by physical properties of refrigerant and refrigerating machine oil used in the refrigeration and air-conditioning apparatus 100. "p" represents a density [kg/m³] of the spherical refrigerating machine oil droplet 23. "q" represents a speed [m/s] of the refrigerant 21 in liquid form flowing upward through the upward-flow pipe 7a. As described above, "D" represents an inner diameter [m] of the upward-flow pipe 7a, that is, the diameter [m] of the spherical refrigerating machine oil droplet 23. "A" represents a cross-sectional area [m²] of the spherical refrigerating machine oil droplet 23 taken along the cross-section perpendicular to the upward-flow direction of the refrigerant 21 in liquid form. "A" is expressed by the following expression (2).

$$A = \pi \times D^2/4 \ldots \quad (2)$$

A gravitational force F2 applied to the spherical refrigerating machine oil droplet 23 is expressed by the following expression (3).

$$F2 = m \times g \ldots \quad (3)$$

In this expression, "g" represents a gravitational acceleration [m/s²]. "m" represents a mass [kg] of the spherical refrigerating machine oil droplet 23, and is expressed by the following expression (4).

$$m = \pi \times D^3 \times p/6 \ldots \quad (4)$$

When the fluid force F1 is greater than the gravitational force F2 applied to the spherical refrigerating machine oil droplet 23, the spherical refrigerating machine oil droplet 23 that is least likely to flow upward in the upward-flow pipe 7a can still flow upward with the refrigerant 21 in liquid form in the upward-flow pipe 7a. That is, when the fluid force F1 is greater than the gravitational force F2 applied to the spherical refrigerating machine oil droplet 23, all the separate refrigerating machine oil 22 present in the upward-flow pipe 7a flows upward with the refrigerant 21 in liquid form in the upward-flow pipe 7a. Thus, when the fluid force F1 is greater than the gravitational force F2 applied to the spherical refrigerating machine oil droplet 23, the refrigerating machine oil can be prevented from staying in the upward-flow pipe 7a. This can prevent an insufficient amount of refrigerating machine oil stored in the compressor 1.

Therefore, the refrigeration and air-conditioning apparatus 100 according to the present embodiment has a configuration in which the refrigerant 21 in liquid form flows upward through the upward-flow pipe 7a at such a speed that the fluid force F1 is greater than the gravitational force F2 applied to the spherical refrigerating machine oil droplet 23. In other words, in the refrigeration and air-conditioning apparatus 100 according to the present embodiment, the control unit 31 in the controller 30 controls the driving frequency of the compressor 1 such that the refrigerant 21 in liquid form flows upward through the upward-flow pipe 7a at the speed as described above. For example, the speed of the refrigerant 21 in liquid form flowing upward through the upward-flow pipe 7a, at which the gravitational force F2 applied to the spherical refrigerating machine oil droplet 23 is equal to the fluid force F1, is defined as a lower-limit speed. The control unit 31 in the controller 30 controls the driving frequency of the compressor 1 such that the refrigerant 21 in liquid form flows upward through the upward-flow pipe 7a at a speed higher than the lower-limit speed. For example, the driving frequency of the compressor 1, at which the refrigerant 21 in liquid form flows upward at the lower-limit speed, is defined as a lower-limit driving frequency and stored in the memory 32 in the controller 30. The control unit 31 controls the driving frequency of the compressor 1 to a frequency higher than the lower-limit driving frequency. With this control, the control unit 31 can control the driving frequency of the compressor 1 in such a manner that the refrigerant 21 in liquid form flows upward through the upward-flow pipe 7a at a speed higher than the lower-limit speed.

Note that the compressor 1 may be driven at a constant frequency. The inner diameter of the upward-flow pipe 7a may be adjustable such that the refrigerant 21 in liquid form flows upward through the upward-flow pipe 7a at such a speed that the fluid force F1 is greater than the gravitational force F2 applied to the spherical refrigerating machine oil droplet 23.

During cooling operation, refrigerant in liquid form flows through the refrigerant pipe connecting the heat-source-side heat exchanger 2, which serves as a condenser, and the pressure reducing device 3. The refrigerant pipe connecting the heat-source-side heat exchanger 2 and the pressure reducing device 3 may include an upward-flow pipe in some cases, through which refrigerant in liquid form flows upward. In these cases, it is preferable to determine the speed of refrigerant in liquid form flowing through the upward-flow pipe in the manner as described above. This can prevent refrigerating machine oil from staying in the upward-flow pipe, and accordingly can prevent an insufficient amount of refrigerating machine oil stored in the compressor 1.

The refrigeration and air-conditioning apparatus 100 according to the present embodiment includes the refrigeration cycle circuit 10 in which refrigerant is filled. The refrigeration cycle circuit 10 includes the compressor 1, the condenser, the pressure reducing device 3, the refrigerant pipe connecting the condenser and the pressure reducing device 3, and the evaporator. The refrigerant pipe connecting the condenser and the pressure reducing device 3 includes an upward-flow pipe that is a pipe that extends in the up-down direction and through which refrigerant in liquid form flows upward after the refrigerant flows out of the condenser. Refrigerating machine oil to be stored in the compressor 1 has a density higher than a density of refrigerant in liquid form. Where the inner diameter of the upward-flow pipe is defined as an inner pipe diameter, where a spherical droplet of refrigerating machine oil with a diameter equal to the inner pipe diameter is defined as a spherical refrigerating machine oil droplet, and where a force received by the spherical refrigerating machine oil droplet from refrigerant in liquid form flowing upward through the upward-flow pipe is defined as a fluid force, the refrigeration and air-conditioning apparatus 100 according to the present embodiment has a configuration in which the refrigerant in liquid form flows upward through the upward-flow pipe at such a speed that the fluid force is greater than a gravitational force applied to the spherical refrigerating machine oil droplet.

In the refrigeration and air-conditioning apparatus 100 having the configuration as described above, the fluid force applied to the separate refrigerating machine oil is greater than the gravitational force applied to the separate refrigerating machine oil. Thus, in the refrigeration and air-conditioning apparatus 100 having the configuration as described above, the refrigerant in liquid form flowing upward through the upward-flow pipe helps discharge separate refrigerating machine oil from the upward-flow pipe, and refrigerating machine oil is thus further prevented from staying in the upward-flow pipe, compared to some refrigeration and air-conditioning apparatus. Therefore, the refrigeration and air-conditioning apparatus 100 having the configuration as described above can further prevent the compressor 1, when refrigerating machine oil to be used has a density higher than a density of refrigerant in liquid form, from running out of the refrigerating machine oil, compared to some refrigeration and air-conditioning apparatus.

Particularly, the refrigerating machine oil used in the refrigeration and air-conditioning apparatus 100 according to the present embodiment does not have mutual solubility in refrigerant to be filled in the refrigeration cycle circuit 10, or has a very low degree of mutual solubility in the refrigerant. In a case where this refrigerating machine oil is used, the separate refrigerating machine oil is more likely to stay in the upward-flow pipe, and the compressor is more likely to run out of the refrigerating machine oil. Thus, it is particularly effective to employ the refrigeration and air-conditioning apparatus 100 according to the present embodiment as a refrigeration and air-conditioning apparatus using the refrigerating machine oil as described above.

REFERENCE SIGNS LIST

1: compressor, 2: heat-source-side heat exchanger, 3: pressure reducing device, 4: use-side heat exchanger, 5: four-way valve, 6: refrigerant pipe, 7: refrigerant pipe, 7a: upward-flow pipe, 8: outdoor unit, 9: indoor unit, 10: refrigeration cycle circuit, 21: refrigerant, 22: separate refrigerating machine oil, 23: spherical refrigerating machine oil droplet, 30: controller, 31: control unit, 32: memory, 100: refrigeration and air-conditioning apparatus, 200: building, 201: room, 202: outside

The invention claimed is:

1. A refrigeration and air-conditioning apparatus comprising a refrigeration cycle circuit including a compressor, a condenser, a pressure reducing device, a refrigerant pipe connecting the condenser and the pressure reducing device, and an evaporator, the refrigeration cycle circuit being filled with refrigerant, the refrigerant pipe including an upward-flow pipe, the upward-flow pipe being a pipe extending in an up-down direction and through which the refrigerant in liquid form flows upward after the refrigerant flows out of the condenser, refrigerating machine oil to be stored in the compressor has a density higher than a density of the refrigerant in liquid form, where an inner diameter of the upward-flow pipe is defined as an inner pipe diameter, where a spherical droplet of the refrigerating machine oil with a diameter equal to the inner pipe diameter is defined as a spherical refrigerating machine oil droplet, and where a force received by the spherical refrigerating machine oil droplet from the refrigerant in liquid form flowing upward through the upward-flow pipe is defined as a fluid force, the refrigerant in liquid form flowing upward through the upward-flow pipe at such a speed that the fluid force is greater than a gravitational force applied to the spherical refrigerating machine oil droplet.

2. The refrigeration and air-conditioning apparatus of claim 1, comprising a controller configured to control a driving frequency of the compressor, wherein the controller is configured to control a driving frequency of the compressor, and the refrigerant in liquid form flows upward through the upward-flow pipe at such a speed that the fluid force is greater than a gravitational force applied to the spherical refrigerating machine oil droplet.

3. The refrigeration and air-conditioning apparatus of claim 1, wherein the refrigerant is propane, and the refrigerating machine oil is polyalkylene glycol.

4. The refrigeration and air-conditioning apparatus of claim 1, comprising an indoor unit and an outdoor unit, wherein the condenser is accommodated in the indoor unit, the pressure reducing device is accommodated in the outdoor unit, and the indoor unit is installed at a location lower than the outdoor unit.

* * * * *